(12) United States Patent
Dewar et al.

(10) Patent No.: US 8,484,189 B2
(45) Date of Patent: Jul. 9, 2013

(54) MANAGING PARAMETERS IN FILTER EXPRESSIONS

(75) Inventors: David Dewar, Manotick (CA); Glenn D. Rasmussen, Ottawa (CA); Katherine A. Wallace, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/618,538

(22) Filed: Sep. 14, 2012

(65) Prior Publication Data

US 2013/0013588 A1    Jan. 10, 2013

Related U.S. Application Data

(63) Continuation of application No. 13/036,685, filed on Feb. 28, 2011, now Pat. No. 8,375,060.

(30) Foreign Application Priority Data

Jun. 29, 2010 (CA) .................................. 2706741

(51) Int. Cl.
G06F 17/00 (2006.01)

(52) U.S. Cl.
USPC ........... 707/706; 707/713; 707/723; 707/797; 707/825

(58) Field of Classification Search
USPC ................. 707/706, 713, 723, 741, 797, 825
See application file for complete search history.

(56) References Cited

U.S. PATENT DOCUMENTS

| | | | |
|---|---|---|---|
| 6,801,910 B1 | 10/2004 | Bedell et al. | |
| 7,096,465 B1 * | 8/2006 | Dardinski et al. | ............ 717/178 |
| 7,139,766 B2 | 11/2006 | Thomson et al. | |
| 7,243,106 B2 | 7/2007 | Vierich et al. | |
| 7,426,520 B2 | 9/2008 | Gorelik et al. | |
| 2004/0034615 A1 | 2/2004 | Thomson et al. | |
| 2004/0139045 A1 | 7/2004 | Vierich et al. | |
| 2004/0139102 A1 | 7/2004 | Vierich et al. | |
| 2004/0215626 A1 | 10/2004 | Colossi et al. | |
| 2005/0034064 A1 | 2/2005 | Meyers et al. | |
| 2006/0053128 A1 | 3/2006 | Gestrelius et al. | |

(Continued)

FOREIGN PATENT DOCUMENTS

| | | |
|---|---|---|
| CA | 2435861 A1 | 1/2004 |
| CA | 2643699 A1 | 10/2007 |
| EP | 1447757 A2 | 8/2004 |

OTHER PUBLICATIONS

U.S. Appl. No. 12/336,900, Sep. 14, 2012, 3 pages.

(Continued)

*Primary Examiner* — Sana Al Hashemi
(74) *Attorney, Agent, or Firm* — Francis Lammes; Stephen J. Walder, Jr.; Yeen C. Tham

(57) ABSTRACT

A mechanism is provided for generating a filter expression using tree parameters receives an expression wherein operators of the expression bind multiple data items to a single parameter to form a received expression, generates a default prompt control using received metadata and the received expression and prompts for an input selection using the default prompt control. Responsive to receiving selected values in response to the default prompt control to form received values the computer-implemented process generates a native database query using the received expression with the single parameter and the received values, wherein the single parameter is a tree parameter.

11 Claims, 9 Drawing Sheets

U.S. PATENT DOCUMENTS

| | | | |
|---|---|---|---|
| 2006/0294098 A1 | 12/2006 | Thomson et al. | |
| 2007/0233666 A1 | 10/2007 | Carlson et al. | |
| 2007/0233680 A1 | 10/2007 | Carlson et al. | |
| 2007/0299676 A1 | 12/2007 | Seeds et al. | |
| 2008/0027971 A1 | 1/2008 | Statchuk | |
| 2009/0006447 A1 | 1/2009 | Balmin et al. | |
| 2009/0012983 A1 | 1/2009 | Senneville et al. | |
| 2010/0153333 A1 | 6/2010 | Rasmussen et al. | |
| 2010/0153417 A1 | 6/2010 | Rasmussen et al. | |
| 2011/0258237 A1 | 10/2011 | Thomas | |
| 2011/0295860 A1 | 12/2011 | Dewar et al. | |
| 2011/0320432 A1 | 12/2011 | Dewar et al. | |

OTHER PUBLICATIONS

U.S. Appl. No. 12/336,929, Sep. 14, 2012, 3 pages.
U.S. Appl. No. 13/034,786, Sep. 14, 2012, 2 pages.
U.S. Appl. No. 13/036,685, Sep. 14, 2012, 2 pages.
Final Office Action dated Oct. 11, 2012 for U.S. Appl. No. 13/034,786; 28 pages.
Notice of Allowance mailed Oct. 12, 2012 for U.S. Appl. No. 13/036,685, 7 pages.
Reply Brief filed Nov. 5, 2012, U.S. Appl. No. 12/336,929, 27 pages.
Response to Final Office Action filed Dec. 7, 2012, U.S. Appl. No. 13/034,786, 9 pages.
Response to Office Action filed Sep. 17, 2012, U.S. Appl. No. 13/036,685, 9 pages.
Advisory Action dated Dec. 27, 2012 for U.S. Appl. No. 13/034,786; 4 pages.
Appeal Brief filed Feb. 7, 2013, U.S. Appl. No. 13/034,786, 24 pages.

\* cited by examiner

Reporting system
300

FIG. 5

| Country | State | City | Combination | |
|---|---|---|---|---|
| CA | ON | KIN | Kingston, Ontario, Canada | 500 |
| CA | ON | OTT | Ottawa, Ontario, Canada | |
| CA | ON | TOR | Toronto, Ontario, | |
| US | KS | OTT | Ottawa, Kansas, USA | |
| US | KS | TOP | Topeka, Kansas, USA | |
| US | IL | CHI | Chicago, Illinois, USA | 502 |
| US | IL | OTT | Ottawa, Illinois, USA | |
| US | IL | WAT | Waterloo, Illinois, USA | |
| ... | ... | ... | < other great cities> | |

| | Parameter | Value | |
|---|---|---|---|
| 506 | ?CountryID? | CA, USA | 508 |
| 510 | ?StateID? | IL, KS, ON | 512 |
| 514 | ?MuniID? | OTT, TOP, WAT | 516 |

504

| Country | State | City | Combination |
|---|---|---|---|
| CA | ON | OTT | Ottawa, Ontario, Canada |
| US | KS | OTT | Ottawa, Kansas, USA |
| US | KS | TOP | Topeka, Kansas, USA |
| US | IL | OTT | Ottawa, Illinois, USA |
| US | IL | WAT | Waterloo, Illinois, USA |

518

(Prior Art)

FIG. 6
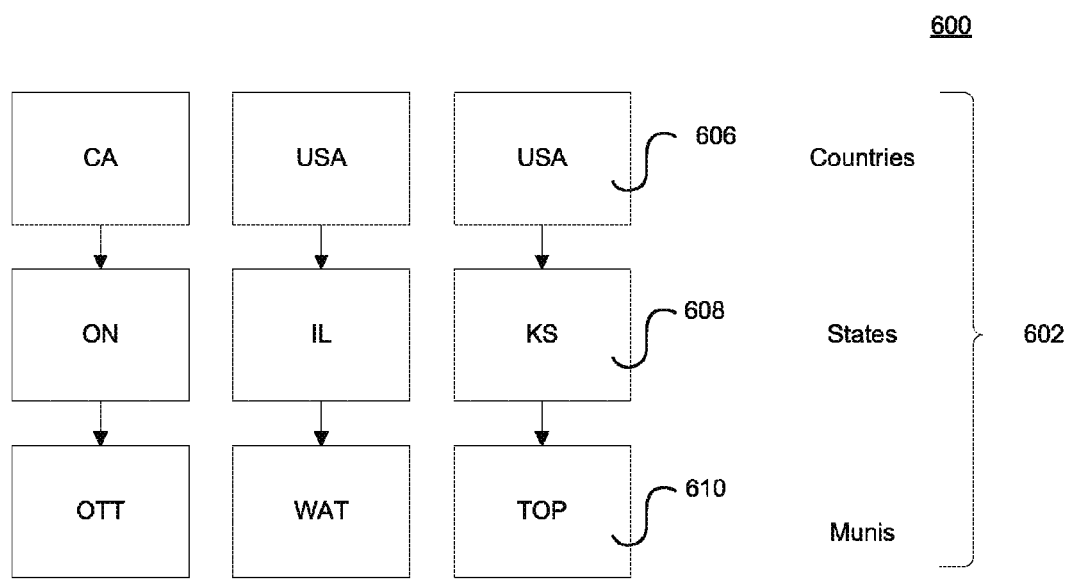
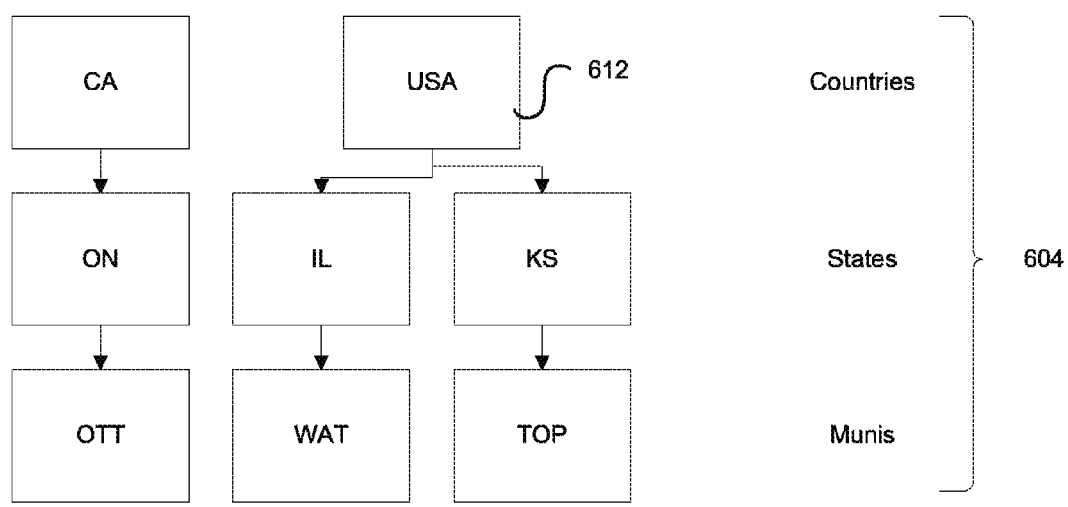

MANAGING PARAMETERS IN FILTER EXPRESSIONS

BACKGROUND

This disclosure relates generally to query processing in a data processing system and more specifically to generating filter expressions using tree parameters to modify a query in a data processing system.

Typical drill-through implementations using some form of query system continue to challenge end users. As more data is available for processing using queries there will be even more pressure to simplify the drill-through experience both for authors and consumers. For example, when dealing with relational data, there are typically too many parameters required to support drill-through to reports based on relationally modeled data. In another example, multiple selections in a source report can result in too much data in a target report after a drill-through operation.

By way of explanation, the following terminology has been used to clarify concepts in the specification. A parameter is a named placeholder that can be used in expressions. A parameter is used like a formal argument for a function in a programming language. Drill-through operations use filter expressions to compare a parameter to a query item to filter data. A parameter value is a value assigned to a parameter at runtime. A parameter value may be specified in a number of ways, including but not limited to: a scalar value (match if the query item value is equal to the parameter value, for example, queryItem=5); a bound range (match if the query item value is within the endpoints specified by the bound range, for example, 1<=queryItem<=5), an unbound range (match if the query item is within the unbound range specified by the endpoint, for example, queryItem>5), and member unique names (MUN) that identify a member in an online analytical processing (OLAP) data source (match if the MUN of the member is equal to the specified MUN). A prompt is a set of user interface elements used to obtain a parameter value for a parameter.

In a normalized relational system, tables represent the various levels from the dimensional model. When linked to a table containing facts, these tables are organized into a snowflake. De-normalization of the level tables is performed to produce a star pattern which results in more efficient database processing. Each level table has one or more keys based on one or more columns. The key columns identify level members as well as provide parent and child associations by foreign key relationships. Some columns are identified as business keys while other columns are considered business labels.

To fully support the hierarchical structure in a report that is a drill-through target, a parameter is required for each business key. For example, in a four level hierarchical structure including country identifier, state identifier, municipality identifier and property identifier, four parameters are required for this simple hierarchy. Consider the challenges faced by authors when faced with applications supporting ten or more hierarchies. Each parameter is created using a filter expression such as: 'StateID in ?StateID?', in which StateID is the query item, and ?StateID? is the parameter. These filters are then combined using an AND operation during the query planning stage to select the appropriate set of rows. This approach to hierarchical structures in relationally modeled systems leads to considerable overhead for authors creating reports that support a wide range of drill-through scenarios. Proposed solutions for constructing filters based on concatenating identifier values prior to comparing identifiers works only when selecting a known classification. The problem with current technology is there is no way to reflect correlations between parameter values when building the filter expression.

BRIEF SUMMARY

According to one embodiment, a computer-implemented process for generating filter expressions using tree parameters receives an expression wherein operators of the expression bind multiple data items to a single parameter to form a received expression, generates a default prompt control using received metadata and the received expression, and prompts for an input selection using the default prompt control. The computer-implemented process receives selected values in response to the default prompt control to form received values and generates a query using the received expression with the single parameter and the received values, wherein the single parameter is a tree parameter.

According to another embodiment, a computer program product for generating a filter expression using tree parameters comprises a computer recordable-type storage media containing computer executable program code stored thereon. The computer executable program code comprises computer executable program code for receiving an expression wherein operators of the expression bind multiple data items to a single parameter to form a received expression, computer executable program code for generating a default prompt control using received metadata and the received expression, computer executable program code for prompting for an input selection using the default prompt control, computer executable program code for receiving selected values in response to the default prompt control to form received values and computer executable program code for generating a query using the received expression with the single parameter and the received values, wherein the single parameter is a tree parameter.

According to another embodiment, an apparatus for generating a filter expression using tree parameters, comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive an expression wherein operators of the expression bind multiple data items to a single parameter to form a received expression, generate a default prompt control using received metadata and the received expression, prompt for an input selection using the default prompt control, receive selected values in response to the default prompt control to form received values, and generate a query using the received expression with the single parameter and the received values, wherein the single parameter is a tree parameter.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 5 is a tabular representation of an unfiltered query result set and a filtered query result set using a prior filter solution;

FIG. 6 is a tabular representation of two versions of the data of FIG. 5, in accordance with one embodiment of the disclosure;

DETAILED DESCRIPTION

Figure 1:
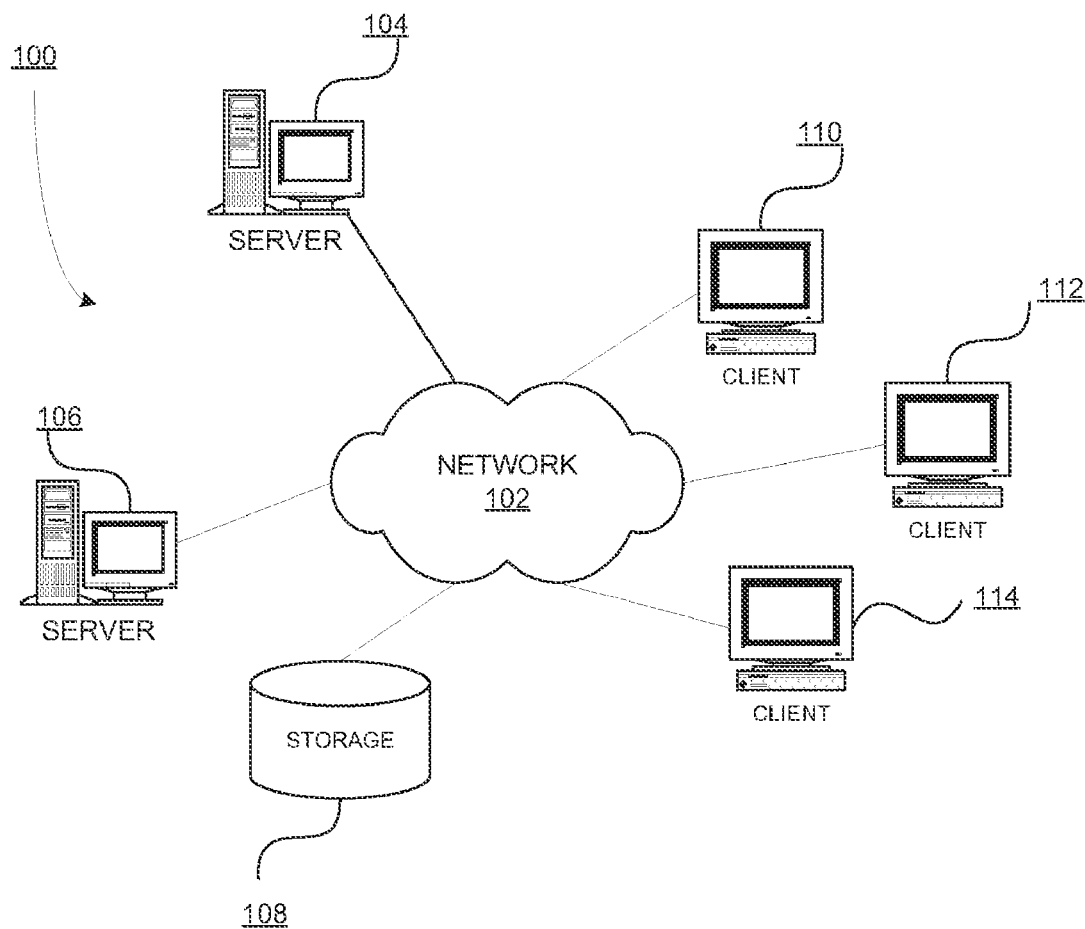
FIG. 1 is a diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
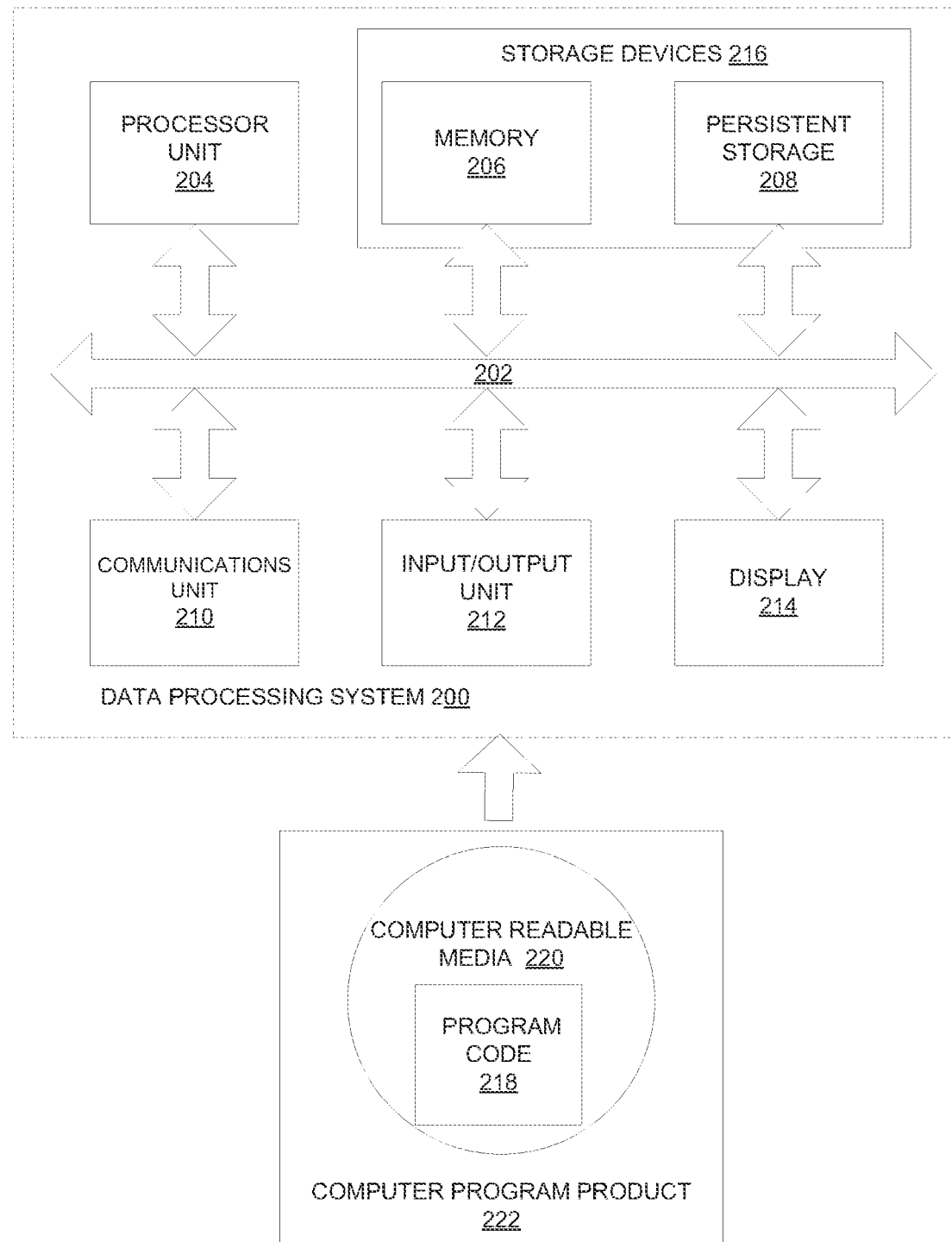
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

According to an illustrative embodiment using data processing system 200 of FIG. 2 as an example, processor unit 204 executes a computer-implemented process for generating filter expressions using tree parameters. Processor unit 204 further executes the computer-implemented process for generating filter expressions using tree parameters to receive an expression wherein operators of the expression bind multiple data items to a single parameter to form a received expression. The expression may be received through communications unit 210, through network 102 of network data processing system 100 of FIG. 1, input/output unit 212 or from storage devices 216. Processor unit 204 further generates a default prompt control using received metadata and the received expression, and prompts for an input selection using the default prompt control. Prompting may use a device such as display 214 to prompt a user for a selection. Processor unit 204 further receives selected values in response to the default prompt control to form received values and generates a query using the received expression with the single parameter and the received values, wherein the single parameter is a tree parameter. The generated query may be passed to a data source, such as a database management system for processing. The generated filter expression may be stored in memory 206 or persistent storage 208 of storage devices 216 for subsequent use.

Although SQL is used in the examples, the same technique can be applied when using other native database query languages and the disclosed process should not be considered constrained to using exemplary SQL constructs of the specific examples as a result. For example, query languages including Data Mining Expressions (DMX), Multidimensional Expressions (MDX) and XML query language (XQuery) may also be used.

In an alternative embodiment, program code 218 containing the computer-implemented process may be stored within computer readable media 220 as computer program product 222. In another illustrative embodiment, the process for generating filter expressions using tree parameters may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 3:
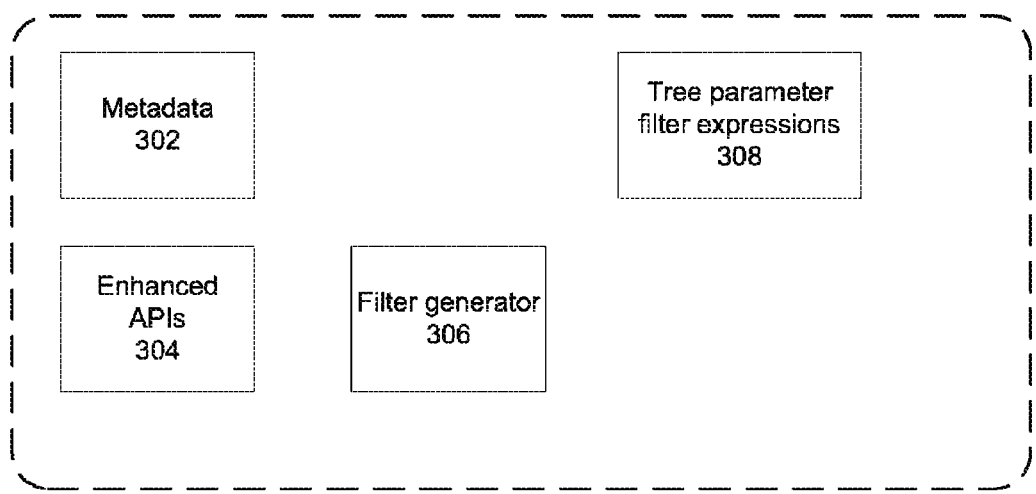
FIG. 3 is a block diagram of components of a reporting system in accordance with various embodiments of the disclosure.

With reference to FIG. 3, a block diagram of a reporting system in accordance with various embodiments of the disclosure is presented. Reporting system 300 is an example of an embodiment of a system handling filtering of data based on multiple query items based on hierarchical structures in a relationally modeled system of a data processing system with values specified as tree parameters.

Reporting system 300 provides a capability to pass tree parameter values as parameter data values for use in generated filter expressions to match against multiple data items of a relationally modeled system. The capability further handles the parameterization of queries to identify data rows when identifiers are unique only within the scope of a container, rather than being globally unique. Other work around solutions typically construct filters based on concatenating identifier values prior to comparing the data items, however, the ability to perform concatenation works only when selecting a known level of data items.

The capability of reporting system 300 results in expression syntax that is typically easier to author than previous workaround techniques. A general form of the syntax is (DI1, ... DIn) in (T1, ... Tn) where each Ti is (V1,... Vn) where Vi is a value. The same filter expression can then be used to select elements of any level in a data hierarchy. Reporting system 300 comprises a number of components supporting a query capability including metadata 302, enhanced application programming interfaces (APIs) 304, filter generator 306, and tree parameter filter expressions 308. Other supporting elements such as a user interface, data services and communications are provided by underlying systems, for example, data processing system 200 of FIG. 2.

Reporting system 300 may be implemented as a standalone addition to an existing query system or as an enhancement within the query system. Having created the filters using reporting system 300, another persona runs a report using selected filters and is prompted for hierarchical data based on specific filters authored into the report, or the metadata model upon which the report is based.

Metadata 302 is a data structure containing the description of the data characteristics of source data in a data hierarchy accessed by the reporting system 300. Enhanced application programming interfaces (APIs) 304 comprise a set of services, methods, or functions extended to handle the multi-item data information. For example, whereas a previous method may have retrieved information for a single data item associated with a parameter, enhanced application programming interfaces 304 provide a capability to retrieve the information for multiple data items contained within metadata 302 associated with a tree parameter.

Having received information from metadata 302 for a request, reporting system 300 generates tree parameter filter expressions 308 using filter generator 306. Metadata for multiple items is accessed at one time but the metadata is the same for each item. Tree parameter filter expressions 308 are a set of filter expressions, wherein the set contains one or more tree parameter filter expressions. A tree filter expression is combined with parameter values to generate a complex structured query language (SQL) filter expression containing n tuples.

Reporting system 300 may be used in a drill-through operation to typically simplify the drill-through experience for authors. The "tree parameter" support provides a capability to address a previous problem, in which too many parameters were required to support drill-through to reports based on relationally modeled data, by requiring only a single parameter per hierarchy in the report. Multiple selections in a source report can result in too much data in target report, for example in FIG. 5 presented later, when used in a drill-through operation. The problem of too much data in the target report is resolved by reflecting the correlation within the data in the generated tree parameter filter expressions.

Figure 4:
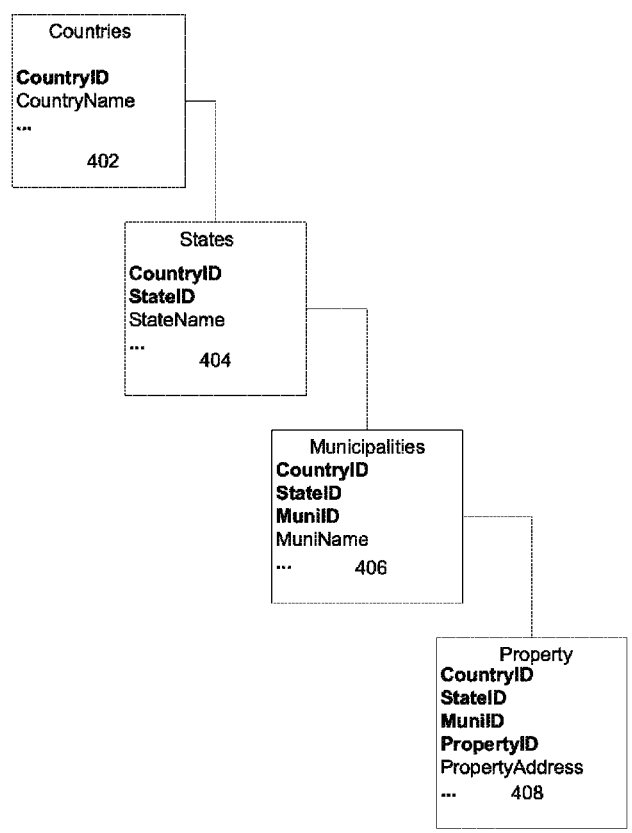
FIG. 4 is a block diagram of a data hierarchy in accordance with one embodiment of the disclosure.

With reference to FIG. 4, a block diagram of a data hierarchy in accordance with one embodiment of the disclosure is presented. Data hierarchy 400 is an example of a set of tables for storing related information organized in a single hierarchy including (Country/State/Municipality/Property). In this example, geographic information is stored.

In a normalized relational system of data hierarchy 400, tables of countries 402, states 404, municipalities 406 and property 408 represent levels from a dimensional model. When linked to a table containing facts, these tables are typically organized into a snowflake arrangement. De-normalization of the tables results in a star pattern for more efficient database processing. Each table has one or more keys based on one or more columns of the respective table. These key columns identify level members as well as provide parent and child associations via foreign key relationships.

As a naming convention in this description, columns with the suffix "ID" are business keys; the other columns can be considered business labels. Countries 402 contains entries for CountryID and CountryName and other miscellaneous information, wherein CountryID may be used with another identifier to form a key. States 404 contains entries for CountryID, StateID and StateName and other miscellaneous information wherein CountryID and StateID may also be combined to form keys. Municipalities 406 contains entries for CountryID, StateID, MuniID, MuniName and other miscellaneous information wherein CountryID, StateID, and MuniID may be used to form keys. Property 308 contains entries for CountryID, StateID, MuniID, PropertyID, PropertyAddress, and other miscellaneous information wherein CountryID, StateID, MuniID, and PropertyID may be used to form a key.

Previous techniques used to fully support this structure in a report that is a drill-through target, required a filter parameter for each business key, such as CountryID. This simple structure therefore required four filter parameters for proper support.

Support for hierarchical structures in relationally modeled systems in this manner typically leads to considerable overhead for authors creating reports that support a wide set of drill-through scenarios. Consider the challenges faced by authors when faced with applications supporting ten or more hierarchies.

Each filter parameter is created using a filter expression such as: StateID in ?StateID? The filters are then ANDed together during the query planning stage to select the appropriate set of rows comprising CountryID in ?CountryID? and StateID in ?StateID? and MuniID in ?MuniID? and PropertyID in ?PropertyID?.

With reference to FIG. 5, a tabular representation of an unfiltered query result set and a filtered query result set using a prior filter solution is presented. Table 500 represents a possible result obtained by querying a set of tables to illustrate a set of unfiltered data items 502. A set of filter parameters and values 504 applied to the same query can be used to obtain the filtered result set 518.

In this example a source report ranks municipalities using a metric, and determines Ottawa Ontario, Topeka Kans., and Waterloo Ill. are the top three cities. To explore these locations further, a selection of three cities is made using drill-through to a detail ranking report. Parameter values passed on the drill-through request are shown in set of filter parameters and values 504. Set of filter parameters and values 504 contains two columns labeled parameter and value. A first row contains values CA and USA 508 for the parameter ?CountryID? 506. A second row contains a parameter ?StateID? 510 and values of IL, KS, and ON 512. A third row contains a parameter ?MuniID? 514 and values of OTT, TOP, and WAT 516.

The set of filter parameter and values, when substituted into a corresponding filter expression, return result set 518. Result set 518 contains five rows (at least), however only three rows were originally expected. The reason too many rows were returned is because of the construction of the filters of CountryID in ?CountryID? and StateID in ?StateID? and MuniID in ?MuniID? and PropertyID in ?PropertyID?. The generated filter expression for these parameter values is (replacing the IN operator with equivalent OR operators): (CountryID='CA' OR CountryID='US') AND (StateID='IL' OR StateID='KS' OR StateID='ON') AND (MuniID='OTT' OR MuniID='TOP' OR MuniID='OTT').

Correspondence between the parameter values has been lost using the described filter construction. The intent of the query was not to request municipalities with an identifier of "OTT", just the municipality with a country identifier of "CA" and a state identifier of "ON". The specification of the filter expression was incorrect therefore the result set produced was also incorrect.

Existing previous solutions can take a filter expression such as StateID in ?States? and process the expression in conjunction with provided parameter values to form a predicate that can be used in a structured language query (SQL). For example, the above filter could be transformed into any of the following expressions: StateID='ON', StateID IN ('ON', 'BC') or StateID NOT IN ('AB', 'YK'). The problem with this previous technology is that there is no way to reflect correlations between parameter values when building the expression.

The disclosed solution defines a new parameter value type that can be used to represent correlated values, for example as a tree, but other representations are also possible and an extension to the expression syntax to leverage the new parameter value type. Using a representative example similar to the previous example, a filter expression using a tree parameter could be expressed in the form of (CountryID, StateID) in ?Geography?. The generated expression could then be expanded into the following structured query language, with a parameter value meaning Ontario and Alberta in Canada, and Texas in USA, in the form of CountryID='CA' and StateID in ('AB', 'ON') or CountryID='US' and StateID='TX'.

With reference to FIG. 6, a block representation 600 of two versions of the multi-level data of FIG. 5, in accordance with one embodiment of the disclosure is presented. In a first view, block 602 represents the unfiltered data items 502 of FIG. 5 in which like things are collected in columns. In a second view block 604 further shows a reduction of duplicate items to form a single representation of block 612.

A "tree parameter" is a parameter that can be used to filter records based on multiple data items. Tree parameters are also designed to solve prompting problems related to hierarchically organized data that is relationally modeled. Previous techniques provided a capability to define one parameter per level of data. In contrast, tree parameters provide a capability to define one parameter per data hierarchy. In the previous example of multiple tables of FIG. 4, four parameters were required to support a query using keys defined from the four tables. With the present invention, only one parameter is required.

To use tree parameters, for example, with drill-through operations, drill paths are therefore extended using the described embodiment to support multiple parameter assignments for a single parameter (one per level for a tree). A drill-through wizard, provided in a user interface of reporting system 300 of FIG. 3 is also enhanced to allow simple mappings of online analytic processing hierarchies to tree parameters using business key items from the online analytic processing domain. The use of parameters associated with hierarchical data can typically be improved by adopting the tree parameter concept described in an embodiment. An explanation regarding the use of tree parameters to introduce additional filter generation semantics is also provided.

Using the geographical tables example of FIG. 4, a filter expression using the tree parameter technique is defined as (CountryID, StateID, MuniID, PropertyID) in ?Geography?. The previous four data levels have thus been associated with a single tree parameter of ?Geography?.

Corresponding parameter values are structured as shown in blocks 602. Blocks 602 include a column containing CountryID 606 with a value of USA, StateID 608 with a value of KS, and MuniID 610 with a value of TOP. In this example the further use of PropertyID is omitted.

Since the set of blocks represents a tree (or more formally, a forest), duplicate values can be eliminated from the blocks. In this case, there is only one duplicate CountryID parameter having a value of USA, so blocks 602 can be re-written as shown in set of blocks 604. When this representation is used, the filter expression using parameters is stated as (CountryID, StateID, MuniID, PropertyID) in ?Geography? in the implementation to select data items. In contrast to a previous solution, a filter was created using known values rather than parameters. The previous solutions typically require a filter expression, for example, in the form of a filter predicate of CountryID="CA' and StateID="ON' and MuniID='OTT' or CountyID='USA' and (StateID='IL' and MuniID='WAT' or StateID='KS' and MuniID='TOP'). Use of a complex filter expression of a form required by previous solutions therefore required a highly skilled user to update the filter expression to respond to different requirements of clients.

Figure 7:
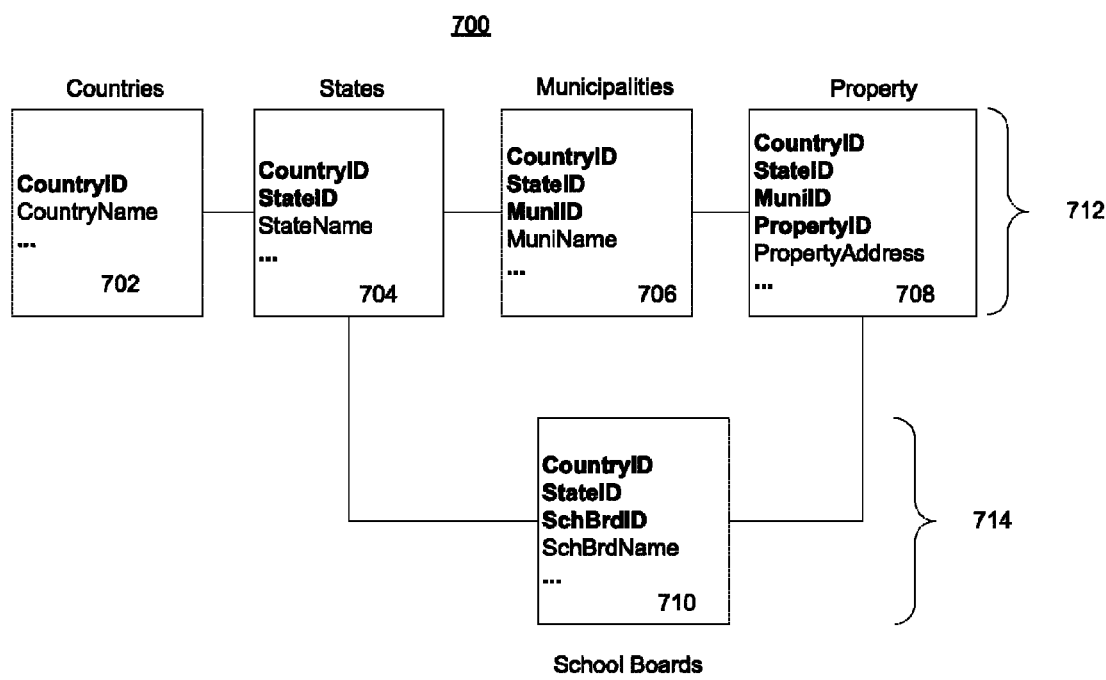
FIG. 7 is a block diagram of a system of tables supporting multiple data hierarchies in accordance with one embodiment of the disclosure.

With reference to FIG. 7, a block diagram of a system of tables supporting multiple hierarchies in accordance with one embodiment of the disclosure is presented. The hierarchies are Countries/States/Municipalities/Properties and Countries/States/SchoolBoards/Properties. This system of tables 700 is an example of a set of tables for storing related information. In this example, geographic information is stored in a similar manner to that of multi-level hierarchy 400 of FIG. 4 however an additional hierarchy is present. However, Country information and State information is shared between the two hierarchies.

Tree parameters are typically suited for filtering data based on discrete data values organized into hierarchies. Some dimensional constructs can be organized into multiple hierarchies. Consider system of tables 700 containing tables of countries 702, states 704, municipalities 706, property 708 and school boards 710. A first set of tables including tables of countries 702, states 704, municipalities 706, property 708 comprises a hierarchy 712. Another set of tables containing school boards 710 forms hierarchy 714 and shares Country information, State information and Property information with hierarchy 712.

The structure of system of tables 700 adds information about school boards 710 to municipalities 706 presented in multi-level hierarchy 400 of FIG. 4. Using system of tables 700 with the tree parameter described FIG. 6 a pair of tree parameters may be defined for the dimensional data items. Each tree parameter represents a different hierarchy of the structures stated as hierarchy 712 containing elements Countries, States, Municipalities, Properties and a hierarchy 714 containing elements Countries, States, School Boards, Properties. Each tree parameter thus consists of multiple items and represents a single hierarchy.

A tree control can thus be used as a default user interface widget for a tree parameter. The tree control provides a prompt capability for the user interface to receive information for each hierarchy in a multiple hierarchy structure. The construction described mimics the hierarchical structure of the data, and blurs the distinction between dimensionally and relationally structured data for consumers of the data.

Figures 8, 9:
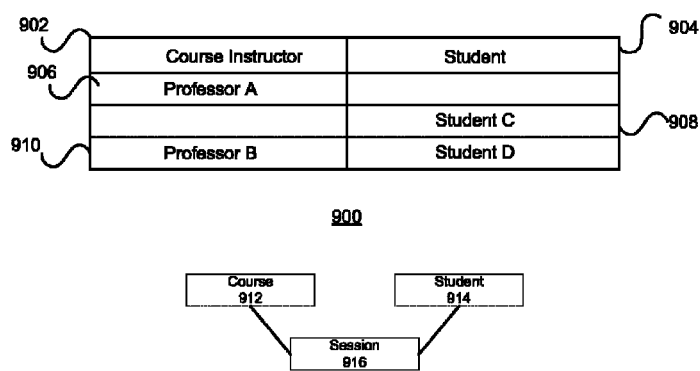
FIG. 8 is a tabular representation of a portion of metadata for the system of tables of FIG. 7, in accordance with one embodiment of the disclosure.
FIG. 9 is a block diagram of a cross-join relationship using a tree parameter representative of FIG. 6 in accordance with one embodiment of the disclosure.

With reference to FIG. 8, a tabular representation of a portion of metadata for the system of tables of FIG. 7, in accordance with one embodiment of the disclosure is presented. Table 800 is an example of a data structure defining information related to a parameter representing data items in a hierarchy in a data structure, such as system of tables 700 of FIG. 7.

Metadata used to define a tree parameter extends current metadata provided for parameters. In the example, parameter metadata is composed of a set of properties, some of which apply to the parameter as a whole while others only apply to metadata of a particular level in the associated hierarchy. The parameter metadata in this example of table 800 comprises a column of properties and a column of values associated with respective properties. Table 800 is further divided into a first section 802 comprising metadata elements associated with a parameter as a whole. A second section 804 is associated with repeating entries of the metadata items at each level of the parameter.

A property capability is typically expressed as a set of capabilities including boundRange, defaultValueNotAcceptable, discreteValue, exclude Values, multivalued, optional, and unboundedRange. Other properties may include a caption, a default value, a name, and a prompt type 806. The prompt type may be one of a set of prompt types comprising types of editBox, selectDate, selectDateTime, selectInterval, selectValue, selectWithSearch, select WithTree. A data type comprising one type for example credential, memberUniqueName, xsdByte, xsdDate, xsdDateTime, xsdDecimal, xsdDouble, xsdDuration, xsdFloat, xsdInt, xsdLong, xsdShort, xsdString, xsdTime, xsdUnsignedByte, xsdUnsignedInt, xsdUnsignedLong, xsdUnsignedShort. A set of value items 808, signaling a repeating portion of the parameter metadata is also defined. Set of value items 808 in the example comprises sets of values 810 including a type, modelFilterItem with a use ValueExpression.

To support tree parameters, the metadata is split into two groups. The first set of metadata items applies to the parameter as a whole, while the second, repeating set of metadata items applies to each level in the tree parameter (for non-tree parameters, the level metadata does not repeat). Capabilities typically contain a selection of reasonable values for the tree parameter including {defaultValueNotAcceptable, discreteValue, exclude Values, multivalued, optional}. A promptType as defined above requires the value is to be selectWithTree for a tree parameter. Values, as previously stated signifies the start of repeating entries of parameter level metadata, each of which including data type, modelFilterItem, and use ValueExpression.

The parameter metadata for the Geography parameter described previously is defined as shown in table 800 in which a Capabilities parameter enables a selection of three choices of discreteValue multivalued optional. The Caption implies a prompt for a user to Select the Municipalities of Interest. A Default Value does not provide any value. The parameter Name has a value of Geography. PromptType 806 is stated as selectWithTree indicating use of a tree control is desired. As previously stated the tree control is typically used to indicate a prompt for data from a user interface.

Values 808 indicates repeating values follow for a set of parameter level metadata in which there are three sets of entries. A first set includes a Type with a value selected from xsdString, ModelFilterItem CountryID and use ValueExpression CountryID. A second set includes a Type with a value selected from xsdString, ModelFilterItem StateID and use ValueExpression StateID. A third set includes a Type with a value selected from xsdString, ModelFilterItem MuniID and use ValueExpression MuniID.

In the previous examples, the hierarchical value type supports discrete values only. Another possibility in an alternative embodiment enables a range to be used in combination with the hierarchy. For example, a range is used to find all camping equipment weighing from 0.5 kg to 5 kg. Added complexity requires a prompting engine to request upper and lower limits. In the current example two type-in boxes for the range as a child of the camping equipment node in the tree would be required. For example, a first type-in box would request a lower bound while a second type-in box would request an upper bound. In either case a value may be expressed as "not specified" to indicate no upper or lower boundary.

With reference to FIG. 9, a block diagram of a composite relationship using the parameter tree views representative of FIG. 7 in accordance with one embodiment of the disclosure is presented. Table 900 is an example of a logical data structure comprising two parameter trees side by side. The composite relationship is formed by a vector product of the tree parameters.

When considering hierarchies, there is an implicit relationship between levels in the hierarchy. However, flexibility can be gained with consideration of how to support composite relationships. For example, consider a report that contains course information for a university. A request to filter on any combination of the course instructor and students that attend the course is desired. This scenario can be handled by defining a vector product tree parameter based on CourseInstructor 902 and Student 904. The filter expression for such a parameter would be ((CourseInstructor)×(Student)) in ?Parameter?

The prompt for the parameter of the example would consist of two side-by-side trees of CourseInstructor 902 and Student 904. The first tree CourseInstructor 902 lists students as child nodes of instructors, while the second tree Student 904 would reverse the order of the relationship. A user of a report would be able to select from both trees. The first tree, CourseInstructor 902 would allow the user to select from all instructors. Expanding the tree enables the user to see students attending courses taught by the instructor represented by the parent node. The second tree, Student 904 allows the user to select from all students. Expanding the tree then enables the user to see the instructors teaching courses attended by the student represented by the parent node for students. Three types of values can be produced by this parameter, as seen in table 900.

The first row 906 represents select all courses instructed by Professor A, while the second row 908 represents select all courses attended by Student C. The third row 910 selects courses taught by Professor B AND attended by Student D. The blank values in the table above are Not Specified, rather than NULL values and are treated differently than NULL values. A simple view of a composite relationship in the previous examples is presented in session 916 representing a convergence of course 912 and student 914.

Figure 10:
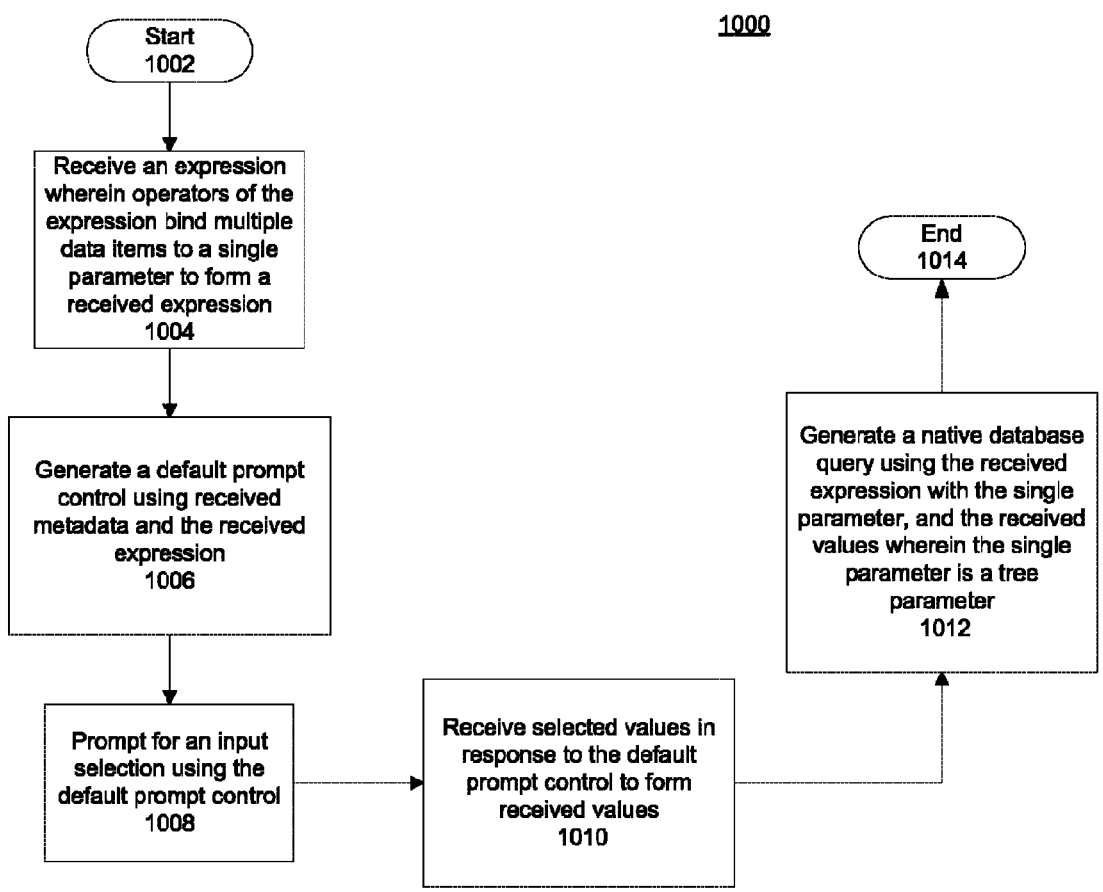
FIG. 10 is a flowchart of a process for creating a filter expression using an implicitly created tree parameter with metadata representative of FIG. 8 in accordance with one embodiment of the disclosure.

With reference to FIG. 10 a flowchart of a process for creating a filter expression using an implicitly created tree parameter with metadata representative of FIG. 8 in accordance with one embodiment of the disclosure is presented. Process 1000 is an example of a process for creating filter expressions using reporting system 300 of FIG. 3.

The example of FIG. 10 further illustrates three interdependent processes mashed together. A first process, is performed by a report author who constructs a filter expression in a report in a form (CountryID, StateID, MuniID, PropertyID) in ?Geography? A second process is performed by a report server which generates a default prompt for an implicitly defined parameter named ?Geography?; the prompt takes the form of a four level tree in this case. Subsequently, a report consumer selects data from the prompt corresponding to items of interest, for example, Canada, Ontario, Ottawa, and USA, Kansas.

A third process is performed by the report server which generates a 'standard' database query using the previously defined filter expression, and substituting values selected by the user, using the prompt, into the expression to form an expression that resembles Country='CA' and State='ON' and Muni='OTT' or Country='USA' and State='KS'. The query statement is typically formed using a query language statement including, but not limited to, statements representative of SQL, MDX or XQuery languages.

Using the three processes enables a report author to define a filter expression that references an implicitly created tree parameter. An analysis of the expression enables calculation of metadata for the tree parameter. Furthermore, the metadata can be used by the reporting system in creation of a suitable prompt, for example a tree, at runtime to collect data values from a client. The filter expression, in conjunction with the parameter values optionally obtained by the prompt, or in the case of drill-through, provided by the drill-through source, may be used to create a structured query language predicate that can be used to filter data in a query in a request.

Process 1000 starts (step 1002) and receives an expression wherein operators of the expression bind multiple data items to a single parameter to form a received expression (step 1004). The expression has defined a parameter value type; wherein the parameter value type stores correlated data values. The expression operators are defined for implicit creation of parameters of the parameter value type, wherein the operator provides a capability of binding multiple data items to a single parameter. The parameter value type stores correlated data values as a forest. Metadata is received for the parameter and a filter expression using the single parameter is generated, wherein the single parameter is a tree parameter and the filter expression provides a capability to modify a query.

Process 1000 generates a default prompt control using received metadata and the received expression (step 1006). Process 1000 receives metadata for a set of data items associated with the single parameter. The metadata for a set of data items comprises a first portion of metadata comprising a set of metadata items applicable to a tree parameter as a whole and a second portion of metadata comprising a repeating set of metadata items applicable to each level of the tree parameter.

Process 1000 prompts for an input selection using the default prompt control (step 1008). Prompting for an input selection presents data selections associated with the metadata and default prompt control to a user. Process 1000 receives selected values in response to the default prompt control to form received values (step 1010).

Process 1000 generates a query using the received expression with the single parameter and the received values wherein the single parameter is a tree parameter (step 1012) with process 1000 terminating thereafter (step 1014). The generated query may be native query in a supported native database query language including but not limited to SQL, MDX and XQuery.

The filter expression using tree parameters of step 1004 further comprises creating a data structure in a memory wherein the data structure provides a capability to pass the correlated data values as a forest. The received expression, using tree parameters, may further comprise a generated composite expression using the expression operators to enable filtering based on a vector product in a general form of $((DI_1, \ldots, DI_i) \times (DI_{i+1}, \ldots, DI_N))$ in ?Parameter?. Combining an expression containing one or more of expression operators with a set of corresponding parameter values forms an equivalent filter expression. The equivalent filter expression is passed to a data source to filter data, wherein a native query language expression represents the equivalent filter expression.

The binding of multiple data items to a single parameter further comprises binding of multiple data items to a single parameter according to a general form of $(DI_1, \ldots DI_n)$ in $(T_1, \ldots T_n)$, wherein each DI represents a data item, each $T_i$ is $(V_1, \ldots V_n)$ and where each $V_i$ is a value.

Thus is provided in an illustrative embodiment, a computer-implemented process for generating a filter expression using tree parameters. The computer-implemented process receives an expression wherein operators of the expression bind multiple data items to a single parameter to form a received expression, generates a default prompt control using received metadata and the received expression and prompts for an input selection using the default prompt control. Responsive to receiving selected values in response to the default prompt control to form received values the computer-implemented process generates a query using the received expression with the single parameter and the received values, wherein the single parameter is a tree parameter.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type storage media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating a filter expression using tree parleers, the method comprising:
   binding multiple data items to a tree parameter to form a received expression, wherein forming the received expression further comprises:
      defining a parameter value type, wherein the parameter value type stores correlated data values as a forest;
      defining operators of the received expression for implicit creation of parameters of the parameter value type, wherein the operators of the received expression provide a capability of binding multiple data items to the tree parameter;
   receiving the metadata for the tree parameter; and
   generating the filter expression using the tree parameter, wherein the filter expression provides a capability to modify a query and wherein generating the filter expression using the tree parameter further comprises generating a vector product using the operators of the expression to enable filtering based on the vector product of a general form of $((DI_1, \ldots, DI_i) \times (DI_{i+1}, \ldots, DI_N))$ in ?Parameter?;
   generating a default prompt control using received metadata and the received expression;
   receiving selected values in response to the default prompt control to form received values; and
   generating a native database query using the received expression with the tree parameter and the received values.

2. A computer program product for generating a filter expression using tree parameters, the computer program product comprising:
   a computer recordable-type storage media containing computer executable program code stored thereon, the computer executable program code comprising:
   computer executable program code for binding multiple data items to a tree parameter to form a received expression wherein the computer executable program code to form the received expression further comprises:
      computer executable program code for defining a parameter value type, wherein the parameter value type stores correlated data values as a forest
      computer executable program code for defining operators of the expression for implicit creation of parameters of the parameter value type,
   wherein the operations of the expression provide capability binding the multiple data items to the tree parameter;
   computer executable program code for receiving the metadata for the tree parameter; and
   computer executable program code for generating the filter expression using the tree parameter, wherein the filter expression provides a capability to modify a query and wherein the computer executable program code for generating the filter expression using the tree parameter further comprises computer executable program code for generating a vector product using the operators of the expression to enable filtering based on the vector product of a general form of $((DI_1, \ldots, DI_i) \times (DI_{i+1}, \ldots, DI_N))$ in ?Parameter?;

computer executable program code for generating a default prompt control using received metadata and the received expression;

computer executable program code for receiving selected values in response Co the default prompt control to form received values; and computer executable, program code for generating a native database query using the received expression with the tree parameter and the received values.

3. An apparatus for generating a filter expression using tree parameters, the apparatus comprising:
   a communications fabric;
   a memory connected to the communications fabric, wherein the memory contains. computer executable program code;
   a communications unit connected to the communications fabric;
   an input/output unit connected to the communications fabric;
   a display connected to the communications fabric; and
   a processor unit connected to the communications fabric, wherein the computer executable program code, when executed by the processor, directs the apparatus to:
   bind multiple data items to a tree parameter to form a received expression wherein the computer executable program code to form the received expression further directs the apparatus to;
      define a parameter value type, wherein the parameter value type stores correlated data values as a forest;
      define operators of the expression for implicit creation of parameters of the parameter value type, wherein the operators of the expression provide a capability of binding the multiple data items to the tree parameter;
      receive the metadata for the tree parameter; and
      generate the filter expression using the tree parameter, wherein the filter expression provides capability to modify a query and wherein the computer executable program code to generate the filter expression using the tree parameter further directs the apparatus to generate a vector product using the operators of the expression to enable filtering based on the vector product of a general form of $((DI_1, \ldots, DI_i) \times (DI_{i+1}, \ldots, DI_N))$ in ?Parameter?;
   generate a default prompt control using received metadata and the received expression;
   receive selected values in response to the default prompt control to form received values; and
   generate a native database query using the received expression with the tree parameter and the received values.

4. The method of claim 1, wherein generating the default prompt control using the received metadata and the received expression further comprises:
   a first portion of the received metadata comprising a set of metadata items applicable to the tree parameter as a whole; and
   a second portion of the received metadata comprising repeating set of metadata. items applicable to each level of the tree parameter.

5. The method of claim 1, wherein generating the native database query using the received expression with the tree parameter and the received values further comprises:
   combining an expression containing one or more of operators of the expression with a set of corresponding parameter values to form an equivalent filter expression.

6. The computer program product of claim 2, wherein the computer executable program code for generating the default prompt control using the received metadata and the received expression further comprises:
   a first portion of the received metadata comprising a set of metadata items applicable to the tree parameter as a whole; and
   a second portion of the received metadata comprising a repeating set of metadata items applicable to each level of the tree parameter 7. The computer program product of claim 2, wherein the computer executable program code for generating the native database query using the received expression with the tree parameter and the received values further comprises;
   computer executable program code for combining an expression containing one or more of operators of the expression with a set of corresponding parameter values to form an equivalent filter expression.

8. The apparatus of claim 3, wherein the computer executable program code to generate the default prompt control using the received metadata and the received expression further directs the apparatus to:
   a first portion of the received metadata comprising a set of metadata items applicable to the tree parameter as a whole; and
   a second portion of the received metadata comprising a repeating set of metadata items applicable to each level of the tree parameter.

9. The apparatus of claim 3, wherein the computer executable program code to generate the native database query using the received expression with the tree parameter and the received values further directs the apparatus to:
   combine an expression containing ore or more of operators of the expression with set of corresponding parameter values to form an equivalent filter expression; and
   pass the equivalent filter expression to a data source to filter data, wherein a native query language expression represents the equivalent filter expression.

10. The method of claim 5, farther comprising:
    passing the equivalent filter expression to a data source to filter data, wherein a native database query language expression represents the equivalent filter expression.

11. The computer program product of claim 7, further comprising:
    computer executable program code for passing the equivalent filter expression to a data source to filter data, wherein a native query language expression represents the equivalent filter expression.

* * * * *